United States Patent [19]

Uhrig et al.

[11] 4,214,872
[45] Jul. 29, 1980

[54] DISPERSING AGENTS FOR FINELY DIVIDING AND STABILIZING DYESTUFFS, PIGMENTS AND OPTICAL BRIGHTENERS AS WELL AS THE DISPERSIONS THEREBY OBTAINED

[75] Inventors: Heinz Uhrig, Steinbach; Karl-Hermann List, Frankfurt am Main; Reinhold Deubel, Altenhain, all of Fed. Rep. of Germany

[73] Assignee: Hoechst Aktiengesellschaft, Frankfurt am Main, Fed. Rep. of Germany

[21] Appl. No.: 777,860

[22] Filed: Mar. 15, 1977

Related U.S. Application Data

[63] Continuation of Ser. No. 608,896, Aug. 29, 1975, abandoned.

[30] Foreign Application Priority Data

Sep. 5, 1974 [DE] Fed. Rep. of Germany ....... 2442514

[51] Int. Cl.³ .............................................. D06P 1/62
[52] U.S. Cl. ...................................................... 8/589
[58] Field of Search ............................................... 8/89

[56] References Cited

U.S. PATENT DOCUMENTS

| 1,722,904 | 7/1929 | Somerville | 8/94.24 |
| 2,058,489 | 10/1936 | Murch | 8/89 |

FOREIGN PATENT DOCUMENTS

| 292531 | 2/1913 | Fed. Rep. of Germany . |
| 1137005 | 4/1963 | Fed. Rep. of Germany . |
| 1156791 | 11/1963 | Fed. Rep. of Germany . |
| 1157214 | 11/1963 | Fed. Rep. of Germany . |
| 1152405 | 2/1964 | Fed. Rep. of Germany . |
| 1960812 | 6/1971 | Fed. Rep. of Germany . |
| 948695 | 2/1964 | United Kingdom . |
| 981545 | 7/1965 | United Kingdom . |
| 1043490 | 9/1966 | United Kingdom . |
| 1239016 | 7/1971 | United Kingdom . |

Primary Examiner—Paul R. Michl
Attorney, Agent, or Firm—Connolly and Hutz

[57] ABSTRACT

Watersoluble condensation products of mono- or di-alkyl naphthalene sulfonic acids and formaldehyde are dispersants for dyestuffs, pigments and optical brighteners, which do not soil textiles and give highly fluid dispersions. The dispersions are stable to heat and storing.

8 Claims, No Drawings

DISPERSING AGENTS FOR FINELY DIVIDING AND STABILIZING DYESTUFFS, PIGMENTS AND OPTICAL BRIGHTENERS AS WELL AS THE DISPERSIONS THEREBY OBTAINED

This application is a continuation of application Ser. No. 608,896 filed Aug. 29, 1975 now abandoned.

For the preparation of dispersions of dyestuffs, pigments and optical brighteners stable to storing and during dyeing, a multitude on non-ionic, anionic and cationic surface active agents are used. The permanently growing requirements as to dyeing and to storage of the dyestuff dispersions made it indispensable to improve the development of the dispersing agents used therein.

Dispersions, for example, with particularly good dispersing and strongly liquifying naphthalene sulfonic acid-form-aldehyde condensates have for the actual requirements an unsufficient stability, whilst other dispersing agents with good stability properties can have a strong thickening effect on the dispersions.

The subject of the invention are dispersions of dyestuffs, pigments and optical brighteners, which contain as dispersing agent condensation products of formaldehyde and sulphonated mono- or dialkyl naphthalenes, wherein the mol ratio of formaldehyde: sulphonated alkylnaphthalene is 0.6 : 1 up to 0.9 :1; and the sulphonation degree is 0.5 to 2, preferably 0.7 to 1 sulfo groups per naphthalene nucleus.

These condensation products can be prepared according to known methods from mono- or dialkylnaphthalenes, optionally under admixture of naphthalene and/or monohydric alcohols and/or naphthols by reaction with a sulphonating agent and a subsequent condensation with formaldehyde or from corresponding sulpho groups containing alkylnaphthalenes and formaldehyde.

The sulphonation is effected, for example, with 100% sulfuric acid, concentrated sulfuric acid or chlorosulfonic acid. The alkylnaphthalenes can also partially be replaced by a mixture of naphthalene and aliphatic mono-alcohols, whereby besides the sulfonation also an alkylation takes place under the conditions of the sulphonation reaction.

When using such mixtures of napthalene and aliphatic mono-alcohols, the mol ratio alkylnaphthalene: unsubstituted naphthalene is 1:0.1 to 1:1, preferably 1:0.2 to 1:0.5. The mol ratio naphthalene: alcohol varies between 1:0 and 1:2.5.

Particularly suitable alkylnaphthalenes are products with 1 or 2 alkyl chains of $C_1$-$C_6$ or corresponding mixtures or technical products. Consequently, short-chained, mono-hydric alcohols of up to 6 carbon atoms will be used when proceeding with mixtures containing naphthalene. The sulphonation degree of the alkylnaphthalenes is chosen in such a way, so that the mol ratio alkylnaphthalene: sulfo group is 1:0.5 to 1:2, preferably 1:0.7 to 1:1. In addition to the sulfonated alkylnaphthalenes, respectively sulfonated naphthalene/alcohol reaction products, the condensation products can also contain sulfonated naphthols. The mol ratio alkylnaphthalenes: naphthol varies between 1:1 and 1:0.2. The condensation of these products with formaldehyde is effected according to known methods, for example, for 15 to 30 hours at a temperature of 50° C., or about 5 to 10 hours at 105° C. Generally, an excess of formaldehyde is necessary.

The preparation of the requested dispersions is effected according to known methods; so, for example, the dyestuffs, pigments or optical brighteners are stirred in a dissolver as press-cake or also in dried form with the dispersing agents or their aqueous solutions with a content of water as little as possible to a suspension having a consistency suitable for being pumped, if necessary to put it for homogenization on a corundum disc mill or similar colloidal mills; generally it is then milled in a continuous stirring mill with quartzite beads of a diameter of 1–3 mm, if necessary in several passages, until the wanted fine dispersion is obtained. Before or after grinding, further additions of bactericides, diluents, further dispersing agents and water can be made for the adjustment of the paste. For obtaining a powder, a suitable paste is dried in a spray tower and subsequently adjusted to type-conformity.

Suitable dyestuffs and pigments are inorganic and organic pigments, vat dyes and especially disperse dyes, as well as other insoluble dyes or dyestuffs difficult to dissolve and optical brighteners.

The ratio of dispersing agents and dispersed material can vary considerably, i.e. generally from 0.01 to 10, preferably from 0.025 to 2 parts by weight of dispersing agent per part of dispersed material, in the case of disperse dyes 0.5 to 2 parts of dispersing agent per part of dyestuff.

Compared with the non-substituted naphthalene sulfonic acid-formaldehyde condensation products, the dispersing agents of this invention yield dyestuff dispersions with a far better stability to heat during dyeing and storing. Furthermore, the dispersing effect is clearly improved and the milling time is reduced.

Compared with other dispersing agents frequently used such as, for example those from the type of the condensation product, cited in FIAT-Final Report 1013, of cresol, 2-naphthol-6-sulfonic acid, formaldehyde and sulfite or compared with different lignin sulfonates, the dispersing agents of this invention have the advantage of an insignificant colour. This means a lower soiling of the fibre, especially in mixed fabrics with wool, and makes it possible to use them as dispersing agent for optical brighteners.

Furthermore, the dispersing agents of the invention have the ability to liquify strongly aqueous press-cakes of dyestuffs, pigments etc., so that it is often possible to obtain dispersions with good flowing properties with a clearly higher dyestuff concentration.

By the choice of the kind and the quantity of the alcohols used for the preparation, the surface tension of the dispersing agents of the invention can be regulated; thus, the wetting properties can advantageously be influenced.

From British Patent Specification No. 1 043 490 it is known that condensation products with a low salt content of optionally substituted naphthalene monosulfonic acids and formaldehyde present, compared with usual salt-containing products, an improved stability to heat of the so prepared dyestuff dispersions. In this Patent there are also cited alkyl groups, beside a multitude of substituents on the naphthalene nucleus. It has, however, not been recognized, that the special condensation products of this invention, independently from the salt content, yield especially advantageous and stable dispersions.

EXAMPLES

The following examples A–K describe the preparation of substances used subsequently as dispersing agents. Parts and percentages are by weight.

Dispersing agent A

At 90° C., 220 parts of 100% sulfuric acid were added in the course of 2 hours to 200 parts of a crude mixture composed of 1- and 2-monomethylnaphthalene and slowly heated under stirring to 140° C.; stirring was then continued until a sample was water-solubile. After cooling to about 70° C., 90 parts of water and 170 parts of a 30% formaldehyde solution were added and the temperature was kept during 20 hours at 80° C.

After dilution with 140 parts of water, the sulfuric acid in excess was precipitated by addition of a suspension of 66 parts of calcium-hydroxide in 100 parts of water and separated by filtration. Finally, the aqueous condensation product is neutralized with a sodium hydroxide solution. By spray-drying, a powder having a low content of electrolytes was obtained.

Dispersing agent B

If 150 parts of 1,(2)-monomethylnaphthalene, 32.2 parts of naphthalene and 26.8 parts of n-butanol were used instead of 200 parts of monomethylnaphthalene in example A, proceeding as indicated in example A; an especially well wetting powder of a low electrolyte content was obtained.

Dispersing agent C

180 Parts of sulfuric acid (96%) were added in the course of 2 hours at 90° C. to 250 parts of a crude product mixture as used in dispersing agents A and B and heated to 140° C. At a pressure of 30–40 mm Hg, the water formed in the reaction was continuously distilled off until a sample was water soluble. After cooling, the condensation is effected during 20 hours at 80° C. by adding 290 parts of a 19.0% formaldehyde solution. After the subsequent neutralisation with sodium hydroxide solution and spray-drying, a powder with a low content of sodium sulfate was obtained.

Dispersing agent D

200 Parts of a crude mixture of dimethylnaphthalenes (main constituent about 40% of 1.6-dimethylnaphthalene) were sulfonated within 4 hours with 220 parts of $H_2SO_4$ (100%) at 130°–134° C. The water-soluble product of the reaction was then cooled to 70° C.; 90 parts of water and 170 parts of formaldehyde solution (30%) were added and subsequently condensation was effected at 80° C. during 20 hours. After precipitation of the sulfuric acid in excess with calcium-hydroxide, the aqueous sulfonic acid was neutralized with sodium hyroxide solution and spray-dried. A clear-brown powder with good dispersing properties was obtained.

Dispersing agent E

If one proceeds as in example D, but using only 110 parts of formaldehyde, a suitable dispersing agent is also obtained.

Dispersing agent F

Proceeding as in the case of example D, but without precipitation of the sulfuric acid in excess with Ca(OH)$_2$, a clear sodium sulfate containing powder is obtained after neutralisation and drying.

Dispersing agent G

It is also possible to obtain a suitable product when using 100 parts of dimethylnaphthalene (as used for substance D) and 100 parts of naphthalene and proceeding as indicated in example D.

Dispersing agent H

In analogy to dispersing agent C, 250 parts of the crude product mixture of 1,6-dimethylnaphthalene with 180 parts of sulfuric acid (96%) were sulfonated while distilling off the water formed in the reaction at 140° C., and condensed with 320 parts of a 19.0% formaldehyde solution at 80° C. during 20 hours.

After neutralization, a clear powder was obtained.

Dispersing agent J

100 Parts of 2,3-dimethylnaphthalene and 100 parts of 1-monomethylnaphthalene (pure) are sulfonated with 210 parts of sulfuric acid (100%) at 80°–90° C. until a sample was water soluble and condensed after addition of 90 parts of water and 170 parts ob a 30% formaldehyde solution during 20 hours at 80° C.

After elimination of the sulfuric acid in excess and neutralization with sodium hydroxide solution, a bright yellow powder was obtained after spray-drying.

Dispersing agent K

210 Parts of 100% sulfuric acid were poured at 90° C. into a mixture of 100 parts of a crude mixture of 1,6-dimethylnaphthalene and 100 parts of β-naphthol; sulfonation was effected at 130°–140° C. until a sample was water soluble. In analogy to substance D, condensation was effected with formaldehyde, the mixture was then treated with calcium hydroxide and adjusted until neutral with sodium hydroxide solution and dried. The clear powder presented good dispersing properties.

For the purpose of comparison of the dispersing properties of the condensation products A–K, use was made of the checking-procedures and dyestuffs described in German Offenlegungsschrift No. 2 132 403.

In the case of check-procedures 1 to 3, in the presence of growing quantities of the dispersing agent to be checked different soluble dyestuffs are precipitated at 3 pH values and their fine dispersion by the dispersing agent was checked. The figures indicated in the table signify the ratio dyestuff: dispersing agent, at which the dyestuff can be dispersed without residue, i.e. the smaller the indicated figure, the higher the dispersing capability. In the check-process 4, a medium-difficult dispersable disperse dyestuff is finely distributed in a 1 l stirring mill; the necessary milling time in hours is indicated in the table. The so obtained dispersion is stored at 50° C. and is checked several times.

The checking-time is indicated in the table in days, in which the dispersion was not yet deteriorated.

As measure for the wetting properties, the last column indicates the surface-tension of a 0.2% solution.

The results obtained with products A–K were compared with a commercial naphthalene sulfonic acid formaldehyde condensation product, Tamol NNO$^{(R)}$. This product was obtained by condensation of 2-naphthalene sulfonic acid and formaldehyde and a subsequent neutralization with sodium carbonate (BIOS Final Report 762, p. 70, edition of the Hobart Publishing Company, Washington, D.C., USA).

| Dispersing Agents Compared with: Tamol NNO | Check-process | | | | Storage stability | Surface tension: (concentration: 2 g/l) [dyn/cm] |
|---|---|---|---|---|---|---|
| | 1 pH 2-5 | 2 pH 7 | 3 pH 9-13 | 4 milling time h | | |
| | 6 | 0.125 | 0.5 | 5 | <1 | 71 |
| A | 1 | 0.065 | 2 | 2 | >21 | 67 |
| B | 1 | 0.125 | <0.5 | 1 | >21 | 58 |
| C | 1 | 0.125 | 1 | 1 | >21 | 65 |
| D | 1 | 0.125 | 1.5 | 1 | >14 | 67 |
| E | 1.5 | 0.25 | 0.5 | 2 | >21 | 64 |
| F | 2 | 0.25 | 1 | 2 | >21 | 68 |
| G | 2 | 0.25 | 1 | 1 | >21 | 62 |
| H | 1 | 0.125 | 1 | 1 | >21 | 60 |
| J | 1 | 0.125 | 0.5 | 2 | >21 | 58 |
| K | 1 | 0.125 | 1 | 3 | >21 | 63 |

Beside this general comparison of the dispersing properties, the following examples illustrate the broad field of application of the substances of this invention.

EXAMPLE 1

70 Parts of a disperse dye, as described in DTAS 2 238 378, example 71, were ground in a 1 l stirring mill with 70 parts of the dispersing agent D and 140 g of water during 6 hours.

A paste with good storage properties was obtained which fully satisfies all coloristic requirements. When using 70 parts of a commercial lignin sulfonate instead of product D, the heat stability is considerably worse.

Similar good results were obtained with the dispersing agents A and H.

EXAMPLE 2

80 Grams of a pigment, resulting from coupling of tetrazotized 3,3'-dichlorobenzimidine on acetoacetyl-m-xylidide, were ground in a 1 l quartzite bead mill for about 2 hours with 20 g of the dispersing agent A and 90 g of water. A very good flowing and fine pigment dispersion was obtained, which did not change its fine dispersion, even when stored for several weeks at 50° C.

If the same quantity of Tamol NNO is used instead of dispersing agent A, it is necessary to use for the milling about 20% more of water and to continue the milling process for about 3.5 hours, in order to obtain a similar fine dispersion, which, however, is distinctly more viscous, despite of the lower pigment content. After one day of storage at 50° C., the fine dispersion is significantly worse.

EXAMPLE 3

160 Parts of a brightener as described in example 1 of German Patent 1 144 014, were ground during 2 hours in a stirring mill with 6.4 parts of the dispersing agent H and 160 parts of water to obtain a fine dispersion; the dispersion was then diluted to a content of 20% of brightener.

In this way, a stable, non settling low-viscous dispersion was obtained.

EXAMPLE 4

100 Parts of Disperse Yellow 64 (C.I. 47 023) were finely dispersed during 2 hours in a 1 l stirring mill with 80 parts of the dispersing agent E and 60 parts of water; a dispersion stable to storage and dyeing was obtained. When the same dyestuff was milled with Tamol NNO, 4 hours were necessary in order to obtain the same fine-dispersion but which deteriorates already after 1 day of storage at 50° C.

Similar good dispersions were obtained with the dispersing agents A, D and F.

EXAMPLE 5

100 Parts of Disperse Violet 31 (C.I. 62 025) were finely dispersed in 2 hours as in Example 4 with 80 parts of dispersing agent B; when Tamol NNO was used, even after a 6 hours' milling time, it was not possible to obtain a stable dispersion.

Good dispersions were also obtained, for example, with the dispersing agents F and G.

EXAMPLE 6

100 parts of the disperse dye mentioned in German Patent No. 1 162 961, were milled in four hours as indicated in the preceeding examples with 80 parts of dispersing agent F to a dispersion stable to storing and to dyeing.

When using Tamol NNO, a fine dispersion was obtained after a 6 hours milling but it was not stable to storing.

We claim:

1. A process for dispersing dyestuffs, pigments and optical brighteners which comprises agitating said dyestuff, pigment or brightener in water with a condensation product of mono- or dimethyl naphthalene sulfonic acid and formaldehyde, said condensation products having been obtained by reacting 0.8 to 1.3 mols of formaldehyde with one mol of naphthalene containing 1 to 2 methyls and 0.5 to 2 sulfo groups per naphthalene nucleus.

2. A process as claimed in claim 1, wherein per naphthalene nucleus 0.7 to 1 sulfo group is present.

3. A process as claimed in claim 1, wherein the condensation product contains 0.2 to 1 mol of naphthol per mol of mono- or dimethylnaphthalene.

4. A composition of matter comprising a dyestuff, pigment or optical brightener and a condensation product as defined in claim 1.

5. A composition as claimed in claim 4, containing 0.01 to 10 parts by weight of condensation product per part by weight of dyestuff, pigment or brightener.

6. A composition as claimed in claim 4, wherein the ratio of said dyestuff, pigment or brightener to said condensation product is 0.025 to 2:1.

7. A composition as claimed in claim 4, consisting essentially of 1 part by weight of a disperse dyestuff, 0.5 to 2 parts by weight of condensation product and such an amount of water that a suspension capable of being pumped is obtained.

8. A dyeing or brightening process which comprises adding to an aqueous bath a composition of matter as claimed in claim 4.

* * * * *